United States Patent
Nagano

(10) Patent No.: US 8,277,549 B2
(45) Date of Patent: Oct. 2, 2012

(54) WATER-BASED INK FOR INK-JET RECORDING, INK SET FOR INK-JET RECORDING, INK-JET RECORDING APPARATUS, METHOD OF INK-JET RECORDING, COLOR CHANGE INHIBITOR, AND METHOD OF SUPPRESSING COLOR CHANGE

(75) Inventor: Taro Nagano, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 420 days.

(21) Appl. No.: 12/608,388

(22) Filed: Oct. 29, 2009

(65) Prior Publication Data

US 2010/0104756 A1    Apr. 29, 2010

(30) Foreign Application Priority Data

Oct. 29, 2008  (JP) .................................. 2008-278091

(51) Int. Cl.
*C09D 11/02* (2006.01)
*B05D 5/00* (2006.01)
*B41J 2/01* (2006.01)
*C09K 15/32* (2006.01)

(52) U.S. Cl. .................. 106/31.48; 106/31.43; 427/256; 347/100; 252/400.4

(58) Field of Classification Search ............... 106/31.48, 106/31.43; 427/256; 347/100; 252/400.4
See application file for complete search history.

(56) References Cited

U.S. PATENT DOCUMENTS

| | | | |
|---|---|---|---|
| 4,303,445 A * | 12/1981 | Whitfield et al. .......... 106/31.58 |
| 5,108,502 A * | 4/1992 | Pawlowski et al. ........ 106/31.48 |
| 5,188,664 A * | 2/1993 | Adamic et al. ............. 106/31.58 |
| 5,192,650 A | 3/1993 | Seto et al. | |
| 5,843,217 A | 12/1998 | Ueda et al. | |

(Continued)

FOREIGN PATENT DOCUMENTS

JP    4-174430 A    6/1992

(Continued)

OTHER PUBLICATIONS

Notification of Reasons for Rejection dated Dec. 2, 2010 in Japanese Application No. 2008-278091 and partial English translation thereof.

*Primary Examiner* — Helene Klemanski
(74) *Attorney, Agent, or Firm* — Banner & Witcoff, Ltd.

(57) ABSTRACT

The present invention provides a water-based ink for ink-jet recording containing a coloring agent, water, and a water-soluble organic solvent. The coloring agent contains a dye represented by the following general formula (1). The ink further includes a boron compound and at least one of amino polycarboxylic acid and amino polycarboxylate.

(1)

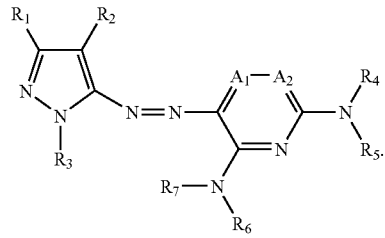

14 Claims, 1 Drawing Sheet

U.S. PATENT DOCUMENTS

| | | | |
|---|---|---|---|
| 5,948,149 A * | 9/1999 | Ito et al. ................... | 106/31.13 |
| 5,985,014 A * | 11/1999 | Ueda et al. ................ | 106/31.58 |
| 6,585,816 B1 * | 7/2003 | Smith et al. ................ | 106/31.29 |
| 6,596,067 B2 | 7/2003 | Menzel et al. | |
| 6,682,591 B2 * | 1/2004 | Smith et al. ................ | 106/31.58 |
| 6,827,771 B2 | 12/2004 | Omatsu et al. | |
| 6,867,286 B1 * | 3/2005 | Holloway et al. ......... | 106/31.48 |
| 7,108,743 B2 | 9/2006 | Fujiwara et al. | |
| 7,109,336 B2 | 9/2006 | Fujiwara et al. | |
| 7,201,477 B2 | 4/2007 | Taguchi et al. | |
| 7,300,506 B2 * | 11/2007 | Vasudevan ................ | 106/31.75 |
| 7,368,007 B2 | 5/2008 | Kusakata et al. | |
| 2003/0097959 A1 | 5/2003 | Omatsu et al. | |
| 2007/0173641 A1 | 7/2007 | Fujiwara et al. | |
| 2007/0186807 A1 | 8/2007 | Goto et al. | |
| 2008/0241398 A1 | 10/2008 | Kato et al. | |
| 2009/0165671 A1 | 7/2009 | Okuda et al. | |
| 2009/0165673 A1 | 7/2009 | Taniguchi et al. | |
| 2009/0167831 A1 | 7/2009 | Okuda et al. | |

FOREIGN PATENT DOCUMENTS

| | | |
|---|---|---|
| JP | 06-032047 | 2/1994 |
| JP | 10-114878 | 5/1998 |
| JP | 2002-053765 | 2/2002 |
| JP | 2002-241659 | 8/2002 |
| JP | 2002-309137 A | 10/2002 |
| JP | 2002-317132 | 10/2002 |
| JP | 2002-317133 | 10/2002 |
| JP | 2002-371079 | 12/2002 |
| JP | 2002-371214 | 12/2002 |
| JP | 2003-012976 | 1/2003 |
| JP | 2003-231823 | 8/2003 |
| JP | 2004-352886 | 12/2004 |
| JP | 2007-217523 | 8/2007 |
| JP | 2007-217524 | 8/2007 |
| JP | 2007-217525 | 8/2007 |
| JP | 2008-246821 | 10/2008 |
| JP | 2009155599 | 7/2009 |
| JP | 2009155600 | 7/2009 |
| JP | 2009155602 | 7/2009 |
| JP | 2009155603 | 7/2009 |
| JP | 2009155604 | 7/2009 |
| JP | 2009155605 | 7/2009 |

* cited by examiner

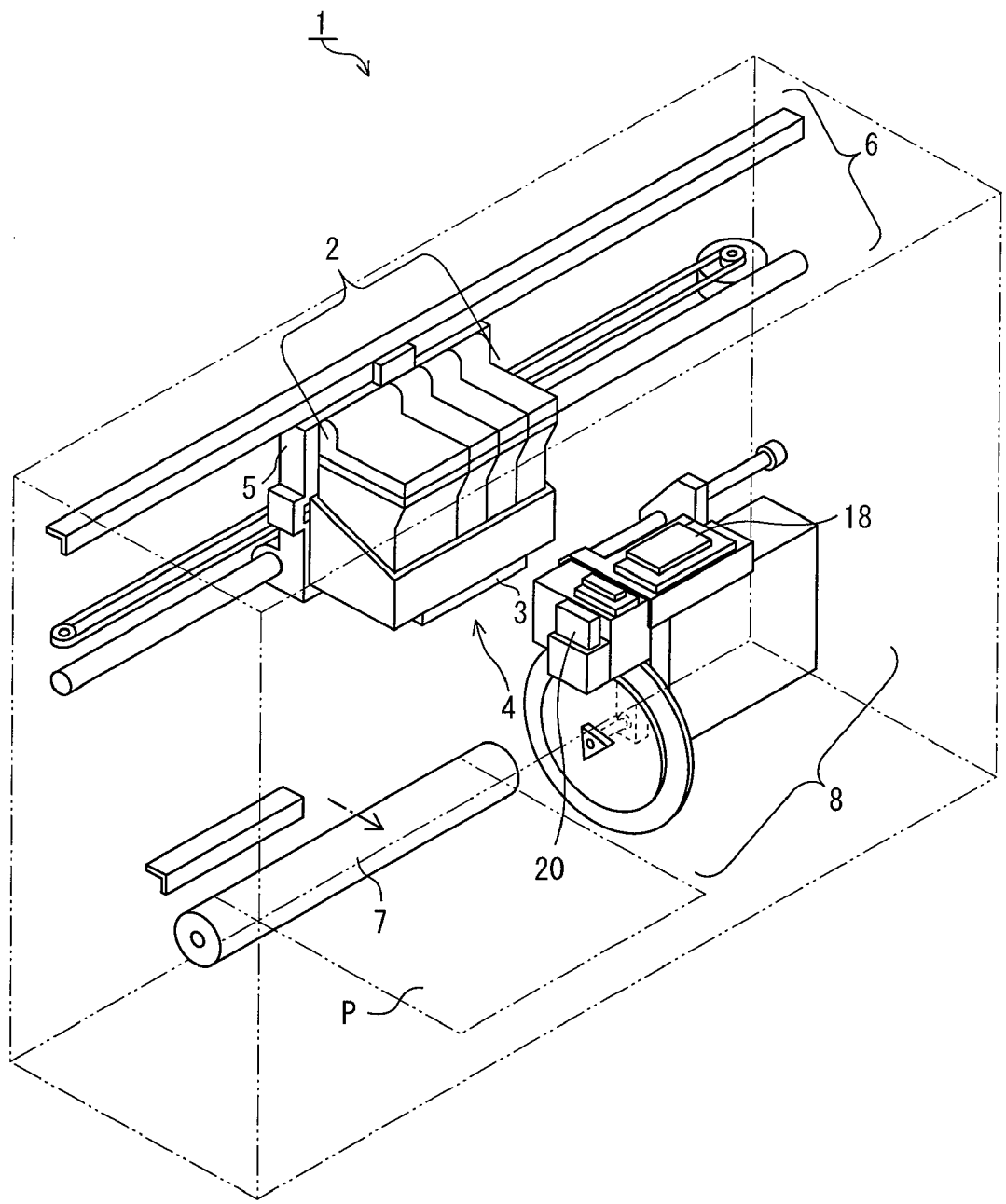

WATER-BASED INK FOR INK-JET RECORDING, INK SET FOR INK-JET RECORDING, INK-JET RECORDING APPARATUS, METHOD OF INK-JET RECORDING, COLOR CHANGE INHIBITOR, AND METHOD OF SUPPRESSING COLOR CHANGE

CROSS-REFERENCE TO RELATED APPLICATION

This application claims priority from Japanese Patent Application No. 2008-278091 filed on Oct. 29, 2008. The entire subject matter of the Japanese Patent Application is incorporated herein by reference.

BACKGROUND

Heretofore, a water-based magenta ink for ink-jet recording comprising a coloring agent, water, and a water-soluble organic solvent has been used widely. The ink is required to have superior ruggedness such as light resistance, ozone resistance, or the like of a recorded object. The ruggedness of a recorded object may be improved by using a magenta dye of high weather resistance as the coloring agent, for example. However, among the high weather resistance magenta dyes, there are some high weather resistance magenta dyes that cause a problem of changing their diffusibility relative to a recording medium as compared to common dyes. For example, humidity affects diffusibility of the high weather resistance magenta dye relative to a recording medium. Therefore, when ink-jet recording is performed using an ink containing the high weather resistance magenta dye, it may cause a problem of changing a color of a recorded object. Particularly, in a case where a water-based magenta ink containing the high weather resistance magenta dye is mixed with a water-based yellow ink and a water-based cyan ink on a recording medium to record process black (it may also be referred to as tricolor black or composite black), a color tone of the magenta in the process black is weakened due to diffusion of the high weather resistance magenta dye, and achromatic color (for example, a color in a gradation range from black to gray) may be seen as taking on a green tinge.

SUMMARY

A water-based ink for ink-jet recording comprises a coloring agent, water, and a water-soluble organic solvent. The coloring agent comprises a dye represented by the following general formula (1), and the ink further comprises a boron compound and at least one of amino polycarboxylic acid and amino polycarboxylate (hereinafter, also may be referred to as "a boron compound and amino polycarboxylic acid and the like").

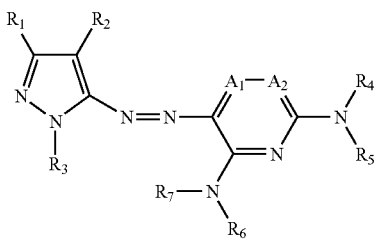

(1)

wherein in the general formula (1),
$R_1$ represents a hydrogen atom, a substituted or unsubstituted alkyl group, or a substituted or unsubstituted aryl group;
$R_2$ represents a hydrogen atom, a halogen atom, or a cyano group;
$R_3$ represents a hydrogen atom, a substituted or unsubstituted alkyl group, a substituted or unsubstituted aryl group, or a substituted or unsubstituted heterocyclic group;
$R_4$, $R_5$, $R_6$ and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_4$, $R_5$, $R_6$, and $R_7$ may be the same or different, provided that $R_4$ and $R_5$ are not both hydrogen atoms, and that $R_6$ and $R_7$ are not both hydrogen atoms; and
$A_1$ and $A_2$ are both substituted or unsubstituted carbon atoms, or one of $A_1$ and $A_2$ is a substituted or unsubstituted carbon atom and the other is a nitrogen atom.

An ink set for ink-jet recording comprises a water-based yellow ink, a water-based magenta ink, and a water-based cyan ink. The ink set comprises the water-based ink for ink-jet recording as the water-based magenta ink.

An ink-jet recording apparatus comprises an ink storing portion and an ink ejecting unit. An ink stored in the ink storing portion is ejected by the ink ejecting unit. The water-based ink for ink-jet recording or an ink configuring the ink set for ink-jet recording is stored in the ink storing portion.

A method of ink-jet recording is a method of ink-jet recording performing recording using two or more kinds of water-based inks for ink-jet recording. The two or more kinds of inks each comprise a coloring agent, water, and a water-soluble organic solvent, at least one ink selected from the two or more kinds of inks further comprises a boron compound and amino polycarboxylic acid and the like, and recording is performed with the two or more kinds of inks.

A color change inhibitor is a color change inhibitor for suppressing color change of a recorded object that is recorded with a water-based ink for ink-jet recording comprising a coloring agent, water, and a water-soluble organic solvent. The color change inhibitor comprises a boron compound and amino polycarboxylic acid and the like.

A method of suppressing color change is a method of suppressing color change of a recorded object that is recorded with a water-based ink for ink-jet recording. The ink comprises a coloring agent, water, a water-soluble organic solvent, and the color change inhibitor, and recording is performed with the ink.

BRIEF DESCRIPTION OF THE DRAWINGS

FIG. 1 is a schematic perspective view showing an example of the configuration of the ink-jet recording apparatus.

DETAILED DESCRIPTION

In the water-based ink for ink-jet recording, color change of a recording object may suppress by a boron compound and amino polycarboxylic acid and the like.

In the water-based ink for ink-jet recording, the boron compound may comprise at least one compound selected from the group consisting of boric acid, boric acid salt, boric acid ester, and borate ester.

In the water-based ink for ink-jet recording, the use thereof is not particularly limited and may be used as a water-based magenta ink, for example.

In the method of ink-jet recording, the two or more kinds of inks may comprise three kinds of inks of a water-based yellow ink, a water-based magenta ink, and a water-based cyan ink, at least one ink selected from the three kinds of inks may comprise the boron compound and amino polycarboxylic acid and the like, and process black may be recorded with the three kinds of inks.

In the method of ink-jet recording, the water-based magenta ink may comprise the boron compound and amino polycarboxylic acid and the like.

A coloring agent to which the method of ink-jet recording, the color change inhibitor, and the method of suppressing color change are applicable may comprise a dye represented by the general formula (1), although it is not particularly limited. For example, in recording of process black with three kinds of inks of a water-based yellow ink, a water-based magenta ink, and a water-based cyan ink, when the method of ink-jet recording, the color change inhibitor, and the method of suppressing color change are applied to the dye represented by the general formula (1) comprised in the water-based magenta ink, color change in the process black is suppressed.

Next, the water-based ink for ink-jet recording (hereinafter, also may simply be referred to as "ink" or "water-based ink") is explained. The water-based ink for ink-jet recording comprises a coloring agent, water, and a water-soluble organic solvent. The coloring agent comprises a dye represented by the general formula (1).

As has been described, in the general formula (1), $R_1$ represents a hydrogen atom, a substituted or unsubstituted alkyl group, or a substituted or unsubstituted aryl group; $R_2$ represents a hydrogen atom, a halogen atom, or a cyano group; $R_3$ represents a hydrogen atom, a substituted or unsubstituted alkyl group, a substituted or unsubstituted aryl group, or a substituted or unsubstituted heterocyclic group; $R_4$, $R_5$, $R_6$ and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_4$, $R_5$, $R_6$, and $R_7$ may be the same or different, provided that $R_4$ and $R_5$ are not both hydrogen atoms, and that $R_6$ and $R_7$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom.

In the general formula (1), the substituted or unsubstituted alkyl group may be an alkyl group having 1 to 6 carbon atoms. Examples of the substituted or unsubstituted alkyl group include a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. Examples of the substituent of the substituted alkyl group include a hydroxyl group; an alkoxy group such as a methoxy group, an ethoxy group, and the like; a cyano group; a halogen atom such as a fluorine atom, a chlorine atom, a bromine atom, an iodine atom, and the like; an ionic hydrophilic group such as a carboxylate, a sulfonate, and the like; and the like.

In the general formula (1), the substituted or unsubstituted aryl group may be an aryl group having 6 to 12 carbon atoms. However, in a case of the substituted aryl group, the number of carbon atoms does not include the number of carbon atoms of its substituent(s). Examples of the substituted or unsubstituted aryl group include a phenyl group, a naphthyl group, a p-tolyl group, a p-octylphenyl group, a mesityl group, a p-methoxyphenyl group, an o-chlorophenyl group, a m-(3-sulfopropylamino)phenyl group, and the like. Examples of the substituent of the substituted aryl group include an alkyl group such as a methyl group, an ethyl group, an isopropyl group, a tert-butyl group, a n-octyl group, and the like; the same alkoxy group as described above; the same halogen atom as described above; an alkylamino group such as a methylamino group, a dimethylamino group, and the like; an amide group; a carbamoyl group; a sulfamoyl group; a sulfoamide group; a hydroxyl group; an ester group such as a methoxycarbonyl group, an ethoxycarbonyl group, and the like; and the same ionic hydrophilic group as described above.

In the general formula (1), examples of the halogen atom include a fluorine atom, a chlorine atom, a bromine atom, an iodine atom, and the like.

In the general formula (1), the substituted or unsubstituted heterocyclic group may be a 5- or 6-membered heterocyclic group. Examples of the substituted or unsubstituted heterocyclic group include a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. Examples of the substituent of the substituted heterocyclic group include an amide group, a carbamoyl group, a sulfamoyl group, a sulfoamide group, a hydroxyl group, the same ester group as described above, the same ionic hydrophilic group as described above, and the like.

In the general formula (1), examples of the substituted or unsubstituted sulfonyl group include a methylsulfonyl group, a phenylsulfonyl group, and the like. Examples of the substituent of a substituted sulfonyl group include the same substituted or unsubstituted alkyl group as described above, the same substituted or unsubstituted aryl group as described above, and the like.

In the general formula (1), the substituted or unsubstituted acyl group may be an acyl group having 1 to 12 carbon atoms. However, in a case of the substituted acyl group, the number of carbon atoms does not include the number of carbon atoms of its substituent(s). Examples of the substituted or unsubstituted acyl group include an acetyl group, a benzoyl group, a chloroacetyl group, and the like. Examples of the substituent of the substituted acyl group include the same ionic hydrophilic group as described above, and the like.

As has been described, in the general formula (1), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ may be both substituted or unsubstituted carbon atoms because better performance may be obtained. Examples of the substituent bound to the carbon atoms $A_1$ and $A_2$ include an alkyl group having 1 to 3 carbon atoms, a carboxyl group, a carbamoyl group, a cyano group, and the like.

As has been described, in the general formula (1), $R_4$ and $R_5$ are not both hydrogen atoms, and also $R_6$ and $R_7$ are not both hydrogen atoms. Moreover, in the general formula (1), when the number of substituents of a sulfonic acid group or a carboxyl group is increased, the water solubility of the dye represented by the general formula (1) tends to be improved. Therefore, the number of these substituents may be adjusted in accordance with need.

As one embodiment of the dye (1), for example, in the general formula (1), $R_1$ is an alkyl group; $R_2$ is a cyano group; $R_3$ is a hydrogen atom or a substituted or unsubstituted heterocyclic group; $R_4$ is a hydrogen atom, a substituted or unsubstituted heterocyclic group, or a substituted aryl group; $R_5$ and $R_6$ each are a substituted heterocyclic group or a substituted aryl group; $R_7$ is a hydrogen atom; $A_1$ is a substituted carbon atom; and $A_2$ is a substituted or unsubstituted carbon atom.

As another embodiment of the dye (1), for example, in the general formula (1), $R_1$ is a tert-butyl group; $R_2$ is a cyano group; $R_3$ is a hydrogen atom or a benzothiazolyl group optionally substituted by a sulfonic acid group or its alkali metal base (for example, a benzothiazole-2-yl group); $R_4$ is a hydrogen atom, a benzothiazolyl group optionally substituted by a sulfonic acid group or its alkali metal base (for example, a benzothiazole-2-yl group), or a trialkylphenyl group substituted by a sulfonic acid group or its alkali metal base (for example, a mesityl group); $R_5$ and $R_6$ each are a monoalkylphenyl group, a dialkylphenyl group, or a trialkylphenyl group optionally substituted by a sulfonic acid group or its alkali metal base (for example, a p-octylphenyl group or a mesityl group), or a benzothiazolyl group substituted by a sulfonic acid group or its alkali metal base (for example, a benzothiazole-2-yl group); $R_7$ is a hydrogen atom; $A_1$ is a carbon atom substituted by an alkyl group (for example, a methyl group); and $A_2$ is a carbon atom optionally substituted by a cyano group.

Specific examples of the dye represented by the general formula (1) include compounds represented by structural formulae (1-A) to (1-F) below.

(1-A)

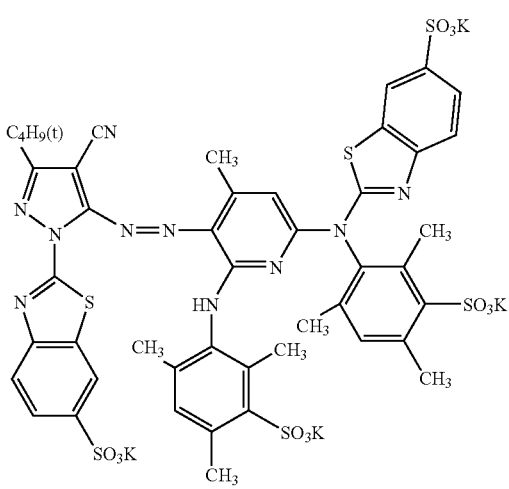

The compound represented by the structural formula (1-A) is one embodiment of the dye (1), wherein in the general formula (1), $R_1$ is a tert-butyl group; $R_2$ is a cyano group; $R_3$ and $R_4$ are 6-potassium sulfonate benzothiazole-2-yl groups; $R_5$ and $R_6$ are 3-potassium sulfonate mesityl groups; $R_7$ is a hydrogen atom; $A_1$ is a carbon atom substituted by a methyl group; and $A_2$ is a carbon atom.

(1-B)

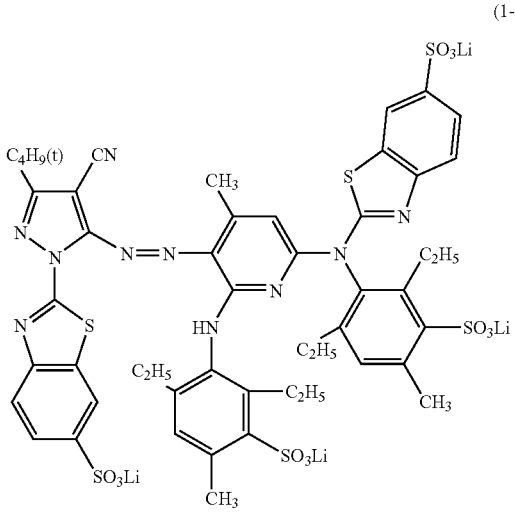

The compound represented by the structural formula (1-B) is another embodiment of the dye (1), wherein in the general formula (1), $R_1$ is a tert-butyl group; $R_2$ is a cyano group; $R_3$ and $R_4$ are 6-lithium sulfonate benzothiazole-2-yl groups; $R_5$ and $R_6$ are 2,6-diethyl-4-methyl-3-lithium sulfonate phenyl groups; $R_7$ is a hydrogen atom; $A_1$ is a carbon atom substituted by a methyl group; and $A_2$ is a carbon atom.

(1-C)

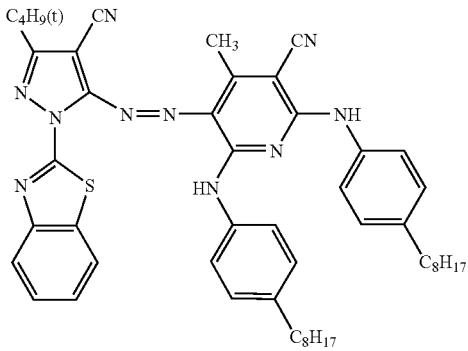

The compound represented by the structural formula (1-C) is still another embodiment of the dye (1), wherein in the general formula (1), $R_1$ is a tert-butyl group; $R_2$ is a cyano group; $R_3$ is a benzothiazole-2-yl group; $R_4$ is a hydrogen atom; $R_5$ and $R_6$ are p-octylphenyl groups; $R_7$ is a hydrogen atom; $A_1$ is a carbon atom substituted by a methyl group; and $A_2$ is a carbon atom substituted by a cyano group.

(1-D)

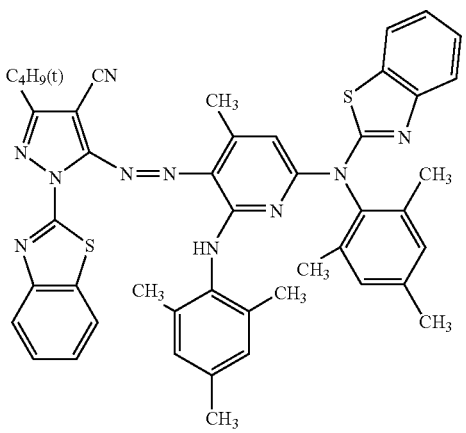

The compound represented by the structural formula (1-D) is yet another embodiment of the dye (1), wherein in the general formula (1), $R_1$ is a tert-butyl group; $R_2$ is a cyano group; $R_3$ and $R_4$ are benzothiazole-2-yl groups; $R_5$ and $R_6$ are mesityl groups; $R_7$ is a hydrogen atom; $A_1$ is a carbon atom substituted by a methyl group; and $A_2$ is a carbon atom.

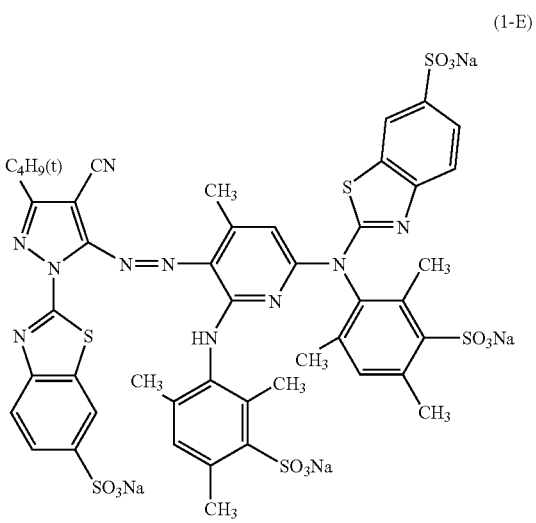

(1-E)

The compound represented by the structural formula (1-E) is yet another embodiment of the dye (1), wherein in the general formula (1), $R_1$ is a tert-butyl group; $R_2$ is a cyano group; $R_3$ and $R_4$ are 6-sodium sulfonate benzothiazole-2-yl groups; $R_5$ and $R_6$ are 3-sodium sulfonate mesityl groups; $R_7$ is a hydrogen atom; $A_1$ is a carbon atom substituted by a methyl group; and $A_2$ is a carbon atom.

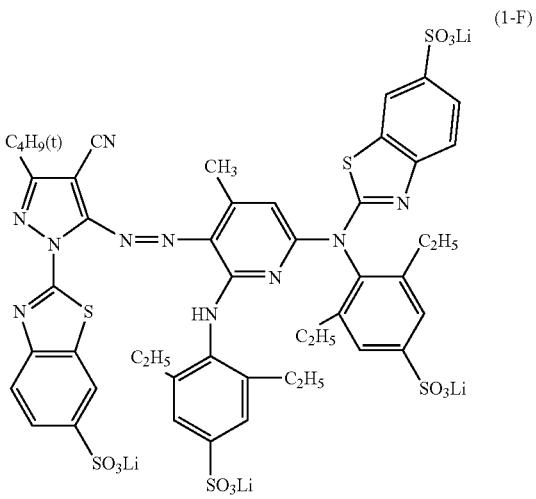

(1-F)

The compound represented by the structural formula (1-F) is yet another embodiment of the dye (1), wherein in the general formula (1), $R_1$ is a tert-butyl group; $R_2$ is a cyano group; $R_3$ and $R_4$ are 6-lithium sulfonate benzothiazole-2-yl groups; $R_5$ and $R_6$ are 2,6-diethyl-4-lithium sulfonate phenyl groups; $R_7$ is a hydrogen atom; $A_1$ is a carbon atom substituted by a methyl group; and $A_2$ is a carbon atom.

The amount of the dye, which is represented by the general formula (1), to be added is not particularly limited. When a water-based ink comprises the dye represented by the general formula (1), ruggedness of a recorded object that is recorded with the water-based ink may be improved. The amount of the dye, which is represented by the general formula (1), to be added with respect to the total amount of the ink is, for example, in the range of about 0.1 wt % to about 7 wt %, and about 0.2 wt % to about 5 wt %.

The coloring agent may contain only the dye represented by the general formula (1) or may further contain other dyes, pigments, and the like.

The water may be ion-exchange water or purified water. The amount of the water to be added with respect to the total amount of the ink is, for example, in the range of about 10 wt % to about 90 wt %, and about 40 wt % to about 80 wt %. The amount of the water to be added may be a balance of the other components, for example.

The water-soluble organic solvent is classified into a humectant and a penetrant. The humectant prevents an ink from drying at a nozzle portion of an ink-jet head, for example. The penetrant adjusts a drying rate of an ink on a recording medium, for example.

The humectant is not particularly limited, and examples thereof include lower alcohol such as methyl alcohol, ethyl alcohol, n-propyl alcohol, isopropyl alcohol, n-butyl alcohol, sec-butyl alcohol, t-butyl alcohol, and the like; amide such as dimethylformamide, dimethylacetamide, and the like; ketone such as acetone, and the like; ketoalcohol such as diacetone alcohol, and the like; ether such as tetrahydrofuran, dioxane, and the like; polyalcohol such as polyalkylene glycol, alkylene glycol, glycerin, and the like; 2-pyrrolidone; N-methyl-2-pyrrolidone; 1,3-dimethyl-2-imidazolidinone; and the like. The polyalkylene glycol is not particularly limited, and examples thereof include polyethylene glycol, polypropylene glycol, and the like. The alkylene glycol is not particularly limited and examples thereof include ethylene glycol, propylene glycol, butylene glycol, diethylene glycol, triethylene glycol, dipropylene glycol, tripropylene glycol, thiodiglycol, hexylene glycol, and the like. Out of these, the humectant may be polyalcohol such as alkylene glycol, glycerin, and the like. One of the humectants may be used alone or two or more of them may be used in combination.

The amount of the humectant to be added with respect to the total amount of the ink (the proportion of the humectant in the ink) is not particularly limited and is, for example, in the range of 0 wt % to about 95 wt %, about 5 wt % to about 80 wt %, and about 5 wt % to about 50 wt %.

The penetrant is not particularly limited, and an example thereof includes glycol ether. The glycol ether is not particularly limited, and examples thereof include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added with respect to the total amount of the ink (the proportion of the penetrant in the ink) is not particularly limited and is, for example, in the range of 0 wt % to about 20 wt %. Setting of the proportion of the penetrant in the aforementioned range makes it possible to achieve suitable penetration of the water-based ink relative to a recording medium such as a recording paper. The proportion of the penetrant may be in the range of about 0.1 wt % to about 15 wt %, and about 0.5 wt % to about 10 wt %.

The water-based ink for ink-jet recording further comprises a boron compound and amino polycarboxylic acid and the like. The boron compound and amino polycarboxylic acid and the like have a function of suppressing color change of a recorded object.

Examples of the boron compound comprise boric acid, boric acid salt, boric acid ester, and borate ester. The boric acid is not particularly limited, and examples thereof comprise orthoboric acid ($H_3BO_3$), metaboric acid ($HBO_2$), hypoboric acid ($H_4B_2O_4$), and the like.

Examples of the boric acid salt comprise sodium borates (sodium metaborate, sodium diborate, sodium tetraborate, sodium pentaborate, sodium hexaborate, and sodium octaborate); potassium borates (potassium metaborate, potassium tetraborate, potassium pentaborate, and potassium hexaborate); ammonium borates (ammonium metaborate, ammonium tetraborate, ammonium pentaborate, and ammonium octaborate) magnesium borates (magnesium metaborate, trimagnesium tetraborate, pentamagnesium tetraborate, and magnesium hexaborate) and lithium borates (lithium metaborate, lithium tetraborate, and lithium pentaborate). The boric acid salt may be a hydrate.

The boric acid ester is a compound represented by the general formula (2).

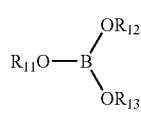

(2)

wherein in the general formula (2), $R_{11}$, $R_{12}$, and $R_{13}$ each represent a hydrogen atom, a substituted or unsubstituted alkyl group, or a substituted or unsubstituted aryl group, provided that $R_{11}$, $R_{12}$, and $R_{13}$ are not all hydrogen atoms. Examples of the substituted or unsubstituted alkyl group and the substituted or unsubstituted aryl group are the same as those of the substituted or unsubstituted alkyl group and the substituted or unsubstituted aryl group in the general formula (1). In a case where $R_{11}$, $R_{12}$, and $R_{13}$ of the boric acid ester comprise hydrogen atoms, the borate ester is a compound in which at least one of the hydrogen atoms is substituted by sodium ion, potassium ion, ammonium ion, lithium ion, or the like.

One of the boron compounds may be used alone or two or more of them may be used in combination. The amount of the boron compound to be added with respect to the total amount of the ink is, for example, in the range of about 0.01 wt % to about 20 wt %, about 0.1 wt % to about 15 wt %, and about 0.1 wt % to about 10 wt %.

Examples of the amino polycarboxylic acid comprise ethylenediaminetetraacetate, nitrilotriacetate, diethylenetriaminepentaacetate, hydroxyethylethylenediaminetriacetate, uramildiacetate, and the like. Examples of the amino polycarboxylate comprise metallic salts of the amino polycarboxylic acid such as tetrasodium ethylenediaminetetraacetate, trisodium nitrilotriacetate, pentasodium diethylenetriaminepentaacetate, and the like.

One of the amino polycarboxylic acids may be used alone or two or more of them may be used in combination. Further, one of the amino polycarboxylates may be used alone or two or more of them may be used in combination. The amount of at least one of the amino polycarboxylic acid and the amino polycarboxylate to be added with respect to the total amount of the ink is, for example, in the range of about 0.01 wt % to about 20 wt %, about 0.1 wt % to about 15 wt %, and about 0.1 wt % to about 10 wt %.

The water-based ink for ink-jet recording may further comprise a conventionally known additive as required. Examples of the additive include a surfactant, a viscosity modifier, a surface tension modifier, a mildewproofing agent, and the like. Examples of the viscosity modifier include polyvinyl alcohol, cellulose, water-soluble resin, and the like.

The water-based ink for ink-jet recording may be prepared by uniformly mixing the coloring agent, water, a water-soluble organic solvent, and a boron compound and amino polycarboxylic acid and the like with other added components as required by a conventionally known method, and then removing sediments with a filter, for example.

The water-based ink for ink-jet recording may be used as a water-based magenta ink, for example. The water-based ink for ink-jet recording may be a water-based ink of a color other than magenta by further comprising a coloring agent other than a coloring agent for magenta.

Next, the ink set for ink-jet recording is explained. As described above, the ink set for ink-jet recording comprises a water-based yellow ink, a water-based magenta ink, and a water-based cyan ink, wherein the ink set comprises the water-based ink for ink-jet recording as the water-based magenta ink. The ink set may further comprise water-based inks of colors other than the aforementioned three colors. Examples thereof comprise a water-based black ink, a water-based red ink, a water-based green ink, a water-based blue ink, water-based light inks of low dye concentrations (for example, a water-based light yellow ink, a water-based light magenta ink, a water-based light cyan ink, a water-based light black ink, a water-based light red ink, a water-based light green ink, and a water-based light blue ink), and the like. As the water-based yellow ink and the water-based cyan ink, for example, conventionally known water-based inks may be used. The water-based yellow ink and the water-based cyan ink may respectively comprise a water soluble yellow dye and a water soluble cyan dye, which show light resistance and ozone resistance comparable to those of the dye represented by the general formula (1). Thereby, the light resistance and the ozone resistance of the water-based yellow ink and the water-based cyan ink become comparable to those of the water-based ink of the present invention, and an ink set is obtained that is small in color balance change of an image even if the color of the image is faded.

Next, the ink-jet recording apparatus is explained. The ink-jet recording apparatus comprises an ink storing portion and an ink ejecting unit, and an ink stored in the ink storing portion is ejected by the ink ejecting unit. The water-based ink for ink-jet recording or an ink configuring the ink set for ink-jet recording is stored in the ink storing portion. Other than this, the ink-jet recording apparatus may have a structure similar to that of a conventionally known ink-jet recording apparatus, for example.

As the ink storing portion, for example, an ink cartridge may be used. As a body of the ink cartridge, for example, a conventionally known body may be used.

FIG. 1 shows a structure of an example of the ink-jet recording apparatus. As shown in FIG. 1, the ink-jet recording apparatus 1 comprises four ink cartridges 2, an ink ejecting unit (ink-jet head) 3, a head unit 4, a carriage 5, a drive unit 6, a platen roller 7, and a purge device 8 as main components.

The four ink cartridges 2 contain water-based inks of four colors, namely, yellow, magenta, cyan, and black, respectively. For example, the water-based magenta ink is the aforementioned water-based ink for ink-jet recording. The ink-jet head 3 performs recording on a recording medium P such as a recording paper. The head unit 4 is provided with the ink jet head 3. The four ink cartridges 2 and the head unit 4 are mounted to the carriage 5. The drive unit 6 reciprocates the carriage 5 in a straight line. A conventionally known drive unit (for example, JP2008-246821) may be used as the drive unit 6. The platen roller 7 extends in a reciprocating direction of the carriage 5 and opposes to the ink-jet head 3. The recording includes recording of letters, images; printing; and the like.

The recording medium P is fed from a paper feeding cassette (not shown) positioned on a side of or underneath the ink-jet recording apparatus 1. The recording medium P is introduced between the ink-jet head 3 and the platen roller 7. Then, a predetermined recording is performed on the recording medium P with the ink ejected from the ink-jet head 3. The recording medium P then is discharged from the ink-jet recording apparatus 1. In FIG. 1, a feeding mechanism and a discharging mechanism of the recording medium P are not shown.

The purge unit 8 draws poor ink containing, for example, air bubbles trapped inside the ink-jet head 3. A conventionally known purge unit (for example, JP2008-246821) may be used as the purge unit 8.

At the platen roller 7 side of the purge unit 8, a wiper member 20 is provided adjacent to the purge unit 8. The wiper member 20 has a spatula shape, and wipes a nozzle-formed surface of the ink-jet head 3 in accordance with the movement of the carriage 5. In FIG. 1, the cap 18 covers the plural nozzles of the ink-jet head 3, which return to the reset position after the completion of recording in order to prevent the ink from drying.

In the ink-jet recording apparatus, the four ink cartridges may be mounted to plural carriages. Alternatively, the four ink cartridges may not be mounted to the carriage, but may be provided and fixed in the ink-jet recording apparatus. In this state, for example, the ink cartridges and the head unit mounted to the carriage are connected via a tube, or the like, and the ink is supplied to the head unit from the ink cartridge.

The types, amounts, forms, and the like of various components such as a coloring agent and the like to which the method of ink-jet recording, the color change inhibitor, and the method of suppressing color change are applicable may be the same as those of the water-based ink for ink-jet recording. The method of ink-jet recording is performed using an ink-jet recording apparatus shown in FIG. 1, for example.

EXAMPLES

Examples of the present invention are described together with Comparative Examples, which are provided for illustrative purposes only.

The present invention is not limited by the following Examples and Comparative Examples.

Examples 1 to 6 and Comparative Examples 1 to 9

Ink components (Table 1) were uniformly mixed. Thereafter, thus obtained mixtures were each filtered with a hydrophilic polytetrafluoroethylene (PTFE) type membrane filter having a pore diameter of 0.20 μm manufactured by Toyo Roshi Kaisha, Ltd. Thus, water-based magenta inks for ink-jet recording of Examples 1 to 6 and Comparative Examples 1 to 9 were obtained. In the following Table 1, the dyes (1-A) and (1-B) are compounds represented by the structural formulae (1-A) and (1-B), respectively.

With respect to each water-based magenta ink of Examples and Comparative Examples, a color change evaluation was carried out by the following method. Samples for the evaluation were prepared as follows.

First, each ink cartridge was filled with each water-based magenta ink of Examples and Comparative Examples. Next, ink cartridges LC11Y and LC11C manufactured by Brother Industries, Ltd. respectively filled with a water-based yellow ink and a water-based cyan ink were provided. Then, three ink cartridges were attached to an ink-jet printer mounted digital multi-function center DCP-385C manufactured by Brother Industries, Ltd. Next, under a condition in which a temperature was 25° C. and a relative humidity was 50%, a black patch was printed on a glossy photo paper BP71GA4 manufactured by Brother Industries, Ltd. with water-based inks comprised in the three ink cartridges. Then the black patch was dried for 24 hours under the same condition as that of the time of printing, and thereby a black patch of a low humidity condition was obtained. Then, a black patch of a high humidity condition was obtained in the same manner as the black patch of a low humidity condition except that the printing and drying were performed under a condition in which a temperature was 33° C. and a relative humidity was 80%.

<Color Change Evaluation>

L* values, a* values, and b* values of the black patch of a low humidity condition and the black patch of a high humidity condition were measured using a spectrophotometer, Spectrolino (light source: $D_{50}$; and status T), manufactured by GretagMacbeth, and the color difference (ΔE) between two conditions of low humidity and high humidity was calculated with the following formula.

$$\Delta E = \{(L^*_1 - L^*_2)^2 + (a^*_1 - a^*_2)^2 + (b^*_1 - b^*_2)^2\}^{1/2}$$

$L^*_1$: an L* value of the black patch of a low humidity condition $L^*_2$: an L* value of the black patch of a high humidity condition $a^*_1$: an a* value of the black patch of a low humidity condition $a^*_2$: an a* value of the black patch of a high humidity condition $b^*_1$: a b* value of the black patch of a low humidity condition $b^*_2$: a b* value of the black patch of a high humidity condition The ink compositions and the results of the color change evaluation of the water-based magenta inks of the Examples and the Comparative Examples are summarized in Table 1.

TABLE 1

|  |  | Example | | | | | | Comparative Example | |
| --- | --- | --- | --- | --- | --- | --- | --- | --- | --- |
|  |  | 1 | 2 | 3 | 4 | 5 | 6 | 1 | 2 |
| Dye | Dye (1-A) | 3.40 | — | 1.70 | 1.70 | 1.70 | 1.70 | 1.70 | 1.70 |
|  | Dye (1-B) | — | 3.40 | 1.70 | 1.70 | 1.70 | 1.70 | 1.70 | 1.70 |

TABLE 1-continued

| | | | | | | | | | |
|---|---|---|---|---|---|---|---|---|---|
| Water-soluble organic solvent | Glycerin | 18.70 | 18.70 | 18.70 | 18.70 | 18.70 | 18.70 | 18.70 | 18.70 |
| | Diethylene glycol | 4.50 | 4.50 | 4.50 | 4.50 | 4.50 | 4.50 | 4.50 | 4.50 |
| | Polyethyleneglycol #200 | 3.00 | 3.00 | 3.00 | 3.00 | 3.00 | 3.00 | 3.00 | 3.00 |
| | Dipropylene glycol-n-propyl ether | 2.00 | 2.00 | 2.00 | 2.00 | 2.00 | 2.00 | 2.00 | 2.00 |
| Surfactant | SUNNOL ® NL1430 (1*) | 1.00 | 1.00 | 1.00 | 1.00 | 1.00 | 1.00 | 1.00 | 1.00 |
| | OLFIN ® E1010 (2*) | 0.90 | 0.90 | 0.90 | 0.90 | 0.90 | 0.90 | 0.90 | 0.90 |
| pH adjuster | Triethanolamine | 0.20 | 0.20 | 0.20 | 0.20 | 0.20 | 0.20 | 0.20 | 0.20 |
| Boron compound | Sodium tetraborate decahydrate | 1.00 | 1.00 | 1.00 | 1.00 | 1.00 | — | — | 1.00 |
| | Orthoboric acid | — | — | — | — | — | 1.00 | — | — |
| Amino polycarboxylate | Tetrasodium ethylenediaminetetraacetate | 1.00 | 1.00 | 1.00 | — | — | 1.00 | — | — |
| | Trisodium nitrilotriacetate | — | — | — | 1.00 | — | — | — | — |
| | Pentasodium diethylenetriaminepentaacetate | — | — | — | — | 1.00 | — | — | — |
| water | water | Balance | Balance | Balance | Balance | Balance | Balance | Balance | Balance |
| Color change evaluation | ΔE | 8.45 | 8.88 | 8.79 | 8.39 | 7.83 | 6.77 | 12.24 | 11.86 |

| | | Comparative Example | | | | | | |
|---|---|---|---|---|---|---|---|---|
| | | 3 | 4 | 5 | 6 | 7 | 8 | 9 |
| Dye | Dye (1-A) | 1.70 | 1.70 | 1.70 | 1.70 | 1.70 | 1.70 | 1.70 |
| | Dye (1-B) | 1.70 | 1.70 | 1.70 | 1.70 | 1.70 | 1.70 | 1.70 |
| Water-soluble organic solvent | Glycerin | 18.70 | 18.70 | 18.70 | 18.70 | 18.70 | 18.70 | 18.70 |
| | Diethylene glycol | 4.50 | 4.50 | 4.50 | 4.50 | 4.50 | 4.50 | 4.50 |
| | Polyethyleneglycol #200 | 3.00 | 3.00 | 3.00 | 3.00 | 3.00 | 3.00 | 3.00 |
| | Dipropylene glycol-n-propyl ether | 2.00 | 2.00 | 2.00 | 2.00 | 2.00 | 2.00 | 2.00 |
| Surfactant | SUNNOL ® NL1430 (1*) | 1.00 | 1.00 | 1.00 | 1.00 | 1.00 | 1.00 | 1.00 |
| | OLFIN ® E1010 (2*) | 0.90 | 0.90 | 0.90 | 0.90 | 0.90 | 0.90 | 0.90 |
| pH adjuster | Triethanolamine | 0.20 | 0.20 | 0.20 | 0.20 | 0.20 | 0.20 | 0.20 |
| Boron compound | Sodium tetraborate decahydrate | — | — | — | — | — | 2.00 | — |
| | Orthoboric acid | 1.00 | — | — | — | — | — | 2.00 |
| Amino polycarboxylate | Tetrasodium ethylenediaminetetraacetate | — | 1.00 | — | — | — | — | — |
| | Trisodium nitrilotriacetate | — | — | 1.00 | — | — | — | — |
| | Pentasodium diethylenetriaminepentaacetate | — | — | — | 1.00 | 2.00 | — | — |
| water | water | Balance | Balance | Balance | Balance | Balance | Balance | Balance |
| Color change evaluation | ΔE | 12.26 | 10.87 | 11.74 | 11.61 | 10.92 | 11.44 | 11.42 |

Ink compositions are expressed in wt %
(1*) polyoxyethylene (3E.O.) alkyl (C = 12, 13) ether sodium sulfate, manufactured by Lion Corporation, active ingredient amount = 28 wt %
(2*) acetylene glycol surfactant (ethylene oxide (10 mol) additive of acetylene diol), manufactured by Nissin Chemical Industry Co., Ltd.

As summarized in Table 1, black patches obtained with the water-based magenta inks of Examples 1 to 6, which comprise a boron compound and amino polycarboxylate, were small in the color differences (ΔE) between two conditions of low humidity and high humidity, and color changes due to humidity were suppressed. In contrast, black patches obtained with the water-based magenta inks of Comparative Examples 1 to 9, which do not comprise both or one of a boron compound and amino polycarboxylate, were large in the color differences (ΔE) and color changes were caused due to humidity.

It will be obvious to those having skill in the art that many changes may be made in the above-described details of the particular aspects described herein without departing from the spirit or scope of the invention as defined in the appended claims.

What is claimed is:

1. A water-based ink for ink-jet recording comprising:
a coloring agent;
water; and
a water-soluble organic solvent, wherein
the coloring agent comprises a dye represented by the following general formula (1), and the ink further comprises a boron compound and at least one of amino polycarboxylic acid containing at least three carboxylic acid groups and amino polycarboxylate containing at least three carboxylate groups;

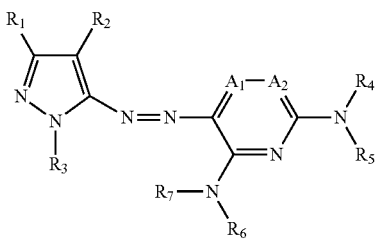

wherein in the general formula (1), $R_1$ represents a hydrogen atom, a substituted or unsubstituted alkyl group, or a substituted or unsubstituted aryl group;

$R_2$ represents a hydrogen atom, a halogen atom, or a cyano group;

R_3 represents a hydrogen atom, a substituted or unsubstituted alkyl group, a substituted or unsubstituted aryl group, or a substituted or unsubstituted heterocyclic group;

R_4, R_5, R_6 and R_7 each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and R_4, R_5, R_6, and R_7 may be the same or different, provided that R_4 and R_5 are not both hydrogen atoms, and that R_6 and R_7 are not both hydrogen atoms; and A_1 and A_2 are both substituted or unsubstituted carbon atoms, or one of A_1 and A_2 is a substituted or unsubstituted carbon atom and the other is a nitrogen atom.

2. The water-based ink for ink-jet recording according to claim 1, suppressing color change of a recording object by a boron compound and at least one of amino polycarboxylic acid and amino polycarboxylate.

3. The water-based ink for ink-jet recording according to claim 1, wherein the boron compound comprises at least one compound selected from the group consisting of boric acid, boric acid salt, boric acid ester, and borate ester.

4. The water-based ink for ink-jet recording according to claim 1, wherein the ink is utilized as a water-based magenta ink.

5. An ink set for ink-jet recording comprising a water-based yellow ink, a water-based magenta ink, and a water-based cyan ink, wherein the ink set comprises the water-based ink for ink-jet recording according to claim 4 as the water-based magenta ink.

6. An ink-jet recording apparatus comprising:
an ink storing portion; and
an ink ejecting unit, an ink stored in the ink storing portion being ejected by the ink ejecting unit, wherein the water-based ink for ink-jet recording according to claim 1 is stored in the ink storing portion.

7. An ink-jet recording apparatus comprising:
an ink storing portion; and
an ink ejecting unit, an ink stored in the ink storing portion being ejected by the ink ejecting unit, wherein an ink configuring the ink set for ink-jet recording according to claim 5 is stored in the ink storing portion.

8. A method of ink-jet recording performing recording with two or more kinds of water-based inks for ink-jet recording, wherein
the two or more kinds of inks each comprise a coloring agent, water, and a water-soluble organic solvent, at least one ink selected from the two or more kinds of inks further comprises a boron compound and at least one of amino polycarboxylic acid containing at least three carboxylic acid groups and amino polycarboxylate containing at least three carboxylate groups, and recording is performed with the two or more kinds of inks.

9. The method of ink-jet recording according to claim 8, wherein the two or more kinds of inks comprise three kinds of inks of a water-based yellow ink, a water-based magenta ink, and a water-based cyan ink, wherein at least one ink selected from the group consisting of the three kinds of inks comprises the boron compound and at least one of amino polycarboxylic acid and amino polycarboxylate, and process black is recorded with the three kinds of inks.

10. The method of ink-jet recording according to claim 9, wherein the water-based magenta ink comprises the boron compound and at least one of amino polycarboxylic acid and amino polycarboxylate.

11. A color change inhibitor for suppressing color change of a recorded object that is recorded with a water-based ink for ink-jet recording comprising a coloring agent, water, and a water-soluble organic solvent, wherein the color change inhibitor comprises a boron compound and at least one of amino polycarboxylic acid containing at least three carboxylic acid groups and amino polycarboxylate containing at least three carboxylate groups.

12. A method of suppressing color change of a recorded object that is recorded with a water-based ink for ink-jet recording, wherein the ink comprises a coloring agent, water, a water-soluble organic solvent, and the color change inhibitor according to claim 11, and recording is performed with the ink.

13. The water-based ink for ink-jet recording according to claim 1, wherein the amino polycarboxylate is at least one of ethylenediaminetetraacetate, nitrilotriacetate, diethylenetriaminepentaacetate, hydroxyethylethylenediaminetriacetate, and metallic salts thereof.

14. A water-based ink for ink-jet recording comprising:
a coloring agent comprising at least one of a dye represented by formula (1-A) and a dye represented by formula (1-B);

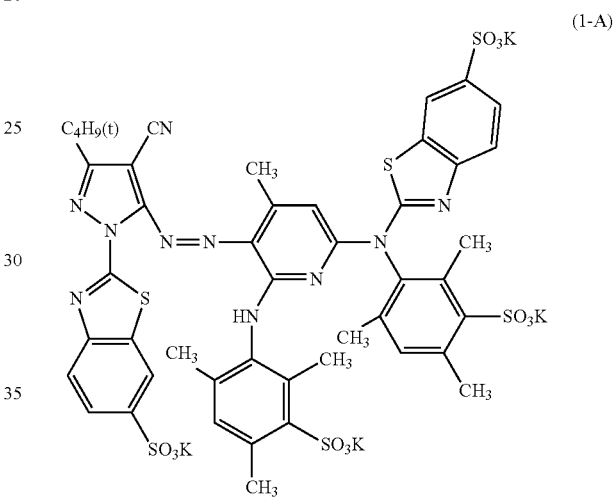

(1-A)

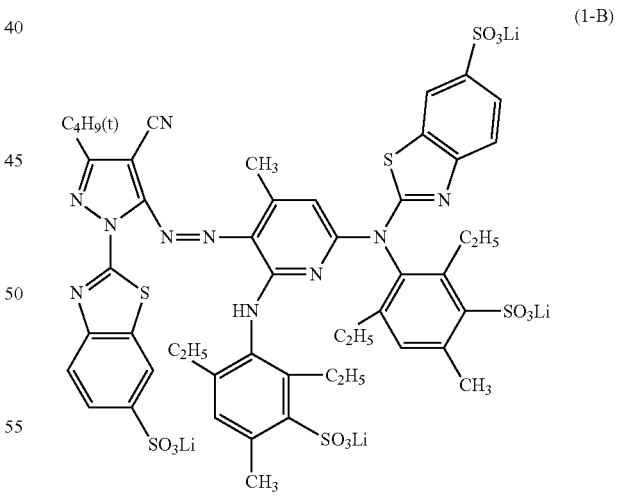

(1-B)

water;
a water-soluble organic solvent;
a boron compound which is at least one of sodium tetraborate decahydrate and orthoboric acid; and
at least one of amino polycarboxylic acid containing at least three carboxylic acid groups and amino polycarboxylate containing at least three carboxylate groups.

* * * * *